(12) United States Patent
Pokornowski et al.

(10) Patent No.: US 8,881,375 B2
(45) Date of Patent: Nov. 11, 2014

(54) METHOD FOR MANUFACTURING A DISK DRIVE HEAD SUSPENSION

(75) Inventors: Zachary A. Pokornowski, Cokato, MN (US); Michael W. Davis, Rockford, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 210 days.

(21) Appl. No.: 13/311,805

(22) Filed: Dec. 6, 2011

(65) Prior Publication Data
US 2012/0073121 A1   Mar. 29, 2012

Related U.S. Application Data

(63) Continuation of application No. 11/849,538, filed on Sep. 4, 2007, now Pat. No. 8,082,656.

(51) Int. Cl.
*G11B 5/127* (2006.01)
*H04R 31/00* (2006.01)
*G11B 5/48* (2006.01)

(52) U.S. Cl.
CPC .............. *G11B 5/484* (2013.01); *G11B 5/4826* (2013.01); *G11B 5/4833* (2013.01)
USPC ............... 29/603.03; 29/603.04; 29/603.07; 205/199; 205/122; 216/39; 216/65; 360/244.2; 360/244.8; 360/245.2; 360/245.5

(58) Field of Classification Search
CPC .. G11B 5/4833; G11B 5/4846; G11B 5/4853; G11B 5/484; G11B 5/4813; G11B 5/4826; G11B 5/295; G11B 5/84; G11B 3/12; G11B 3/124; G11B 3/38; G11B 3/40

USPC ................ 29/603.3, 603.04, 603.06, 603.07; 205/119, 122; 257/778, 783; 216/39, 216/65; 360/244.8, 244.2, 244, 240, 245.2, 360/245.4, 294.4–294.7

See application file for complete search history.

(56) References Cited

U.S. PATENT DOCUMENTS

| | | | |
|---|---|---|---|
| 4,167,765 A | 9/1979 | Watrous | |
| 5,079,660 A * | 1/1992 | Yumura et al. | 360/245.3 |
| 5,428,490 A | 6/1995 | Hagen | |
| 5,879,570 A | 3/1999 | Hagen | |
| 5,966,485 A * | 10/1999 | Luther et al. | 385/85 |
| 6,078,470 A * | 6/2000 | Danielson et al. | 360/245.1 |
| 6,172,853 B1 * | 1/2001 | Davis et al. | 360/245.7 |
| 6,181,522 B1 | 1/2001 | Carlson | |
| 6,246,546 B1 * | 6/2001 | Tangren | 360/245.1 |
| 6,381,100 B1 * | 4/2002 | Bennin et al. | 360/245.9 |
| 6,396,141 B2 * | 5/2002 | Schueller et al. | 257/706 |
| 6,612,016 B1 * | 9/2003 | Bennin et al. | 29/603.03 |

(Continued)

FOREIGN PATENT DOCUMENTS

JP    04272179 A    9/1992

*Primary Examiner* — Paul D Kim
(74) *Attorney, Agent, or Firm* — Faegre Baker Daniels LLP

(57) ABSTRACT

A method for manufacturing a disk drive head suspension having a plated load point dimple. An aperture is etched into the spring metal member. A photoresist mask having an opening with load point-defining side walls and a load point diameter is formed over a portion of a spring metal member including the aperture. Metal is plated onto the spring metal member and into the aperture in the opening to form a load point having the load point diameter on the spring metal member.

20 Claims, 9 Drawing Sheets

(56) References Cited

U.S. PATENT DOCUMENTS

| | | |
|---|---|---|
| 6,617,542 B2 | 9/2003 | Hayen et al. |
| 6,700,748 B1 * | 3/2004 | Cowles et al. ............. 360/245.9 |
| 6,920,820 B2 * | 7/2005 | Meggison et al. ............. 99/422 |
| 7,057,857 B1 | 6/2006 | Niu et al. |
| 7,142,395 B2 * | 11/2006 | Swanson et al. ........... 360/245.9 |
| 7,286,325 B2 * | 10/2007 | Hernandez et al. ........ 360/234.5 |
| 7,384,531 B1 | 6/2008 | Peltoma et al. |
| 8,082,656 B1 | 12/2011 | Pokornowski et al. |
| 2001/0050828 A1 * | 12/2001 | Davis et al. ................ 360/97.01 |
| 2005/0195528 A1 * | 9/2005 | Bennin et al. ............. 360/234.5 |

\* cited by examiner

METHOD FOR MANUFACTURING A DISK DRIVE HEAD SUSPENSION

CROSS-REFERENCE TO RELATED APPLICATION

This application is a continuation of U.S. patent application Ser. No. 11/849,538, filed Sep. 4, 2007, now U.S. Pat. No. 8,082,656, entitled A METHOD FOR MANUFACTURING A DISK DRIVE HEAD SUSPENSION, which application is incorporated herein by reference in its entirety and for all purposes.

TECHNICAL FIELD

The present invention relates generally to head suspensions for use in dynamic storage devices such as rigid disk drives. More particularly, the present invention relates to a load point dimple in a head suspension.

BACKGROUND OF INVENTION

Head suspensions for supporting a head over a rotating disk in hard disk drives are well known. Such head suspensions typically comprise a load beam having a flexure or gimbal at its distal end. A head slider having a read/write transducer is mounted to the flexure. Conductive leads or traces are integrated with the head suspension and connect the read/write transducer to disk drive circuitry via terminal or bond pads. In operation, the rotating disk creates an air bearing on which the head slider floats. The head suspension provides a spring force counteracting the force generated by the air bearing to position the slider at a specified "fly height". The flexure is sufficiently compliant to allow the slider to pitch and roll in response to fluctuations in the air bearing created by variations in the surface of the rotating disk. In this manner, the head slider is supported and can be positioned over the disk by an actuator assembly in the drive to read or write information on the disk.

The use of a dimple, formed in a surface of the head suspension, is also well known. Dimples are used to transfer the spring force generated by the head suspension to the slider and to provide a point about which the slider can move or gimbal in pitch and roll directions at the fly height. Such dimples are referred to as "load point dimples" or "load points" and can be formed in a spring metal member or "tongue" of the flexure to which the slider is mounted. Accurate positioning of the head slider with respect to the load point and the terminal pads is important to the function of the disk drive.

Load point dimples are typically formed by forming or etching processes or by fixing a spherical ball between the flexure and load beam. Examples of such load point structures are shown in U.S. Pat. No. 4,167,765 to Watrous; U.S. Pat. No. 5,428,490 to Hagen; and U.S. Pat. No. 6,181,522 to Carlson. Load points such as those described in the above references have certain disadvantages owing to deformation caused by forming or stack-up of positional tolerances in head suspension assembly operations.

There is a continuing need for improved load points in head suspensions. Specifically, there is a need for a load point and related manufacturing processes that can be precisely located with respect to trace terminal pads and imparts minimal stresses to the surface on which it is located. To be commercially viable, any such load point should be capable of being efficiently manufactured.

SUMMARY OF THE INVENTION

The present invention is a method for manufacturing a disk drive head suspension flexure having a load point on a spring metal member. In one embodiment of the invention, an aperture is etched into the spring metal member. A photoresist mask having an opening with load point-defining side walls and a load point diameter is formed over a portion of the spring metal member including the aperture. Metal is plated onto the spring metal member and into the aperture in the opening to form a load point having a load point diameter on the spring metal member.

DETAILED DESCRIPTION OF THE INVENTION

Figure 1:
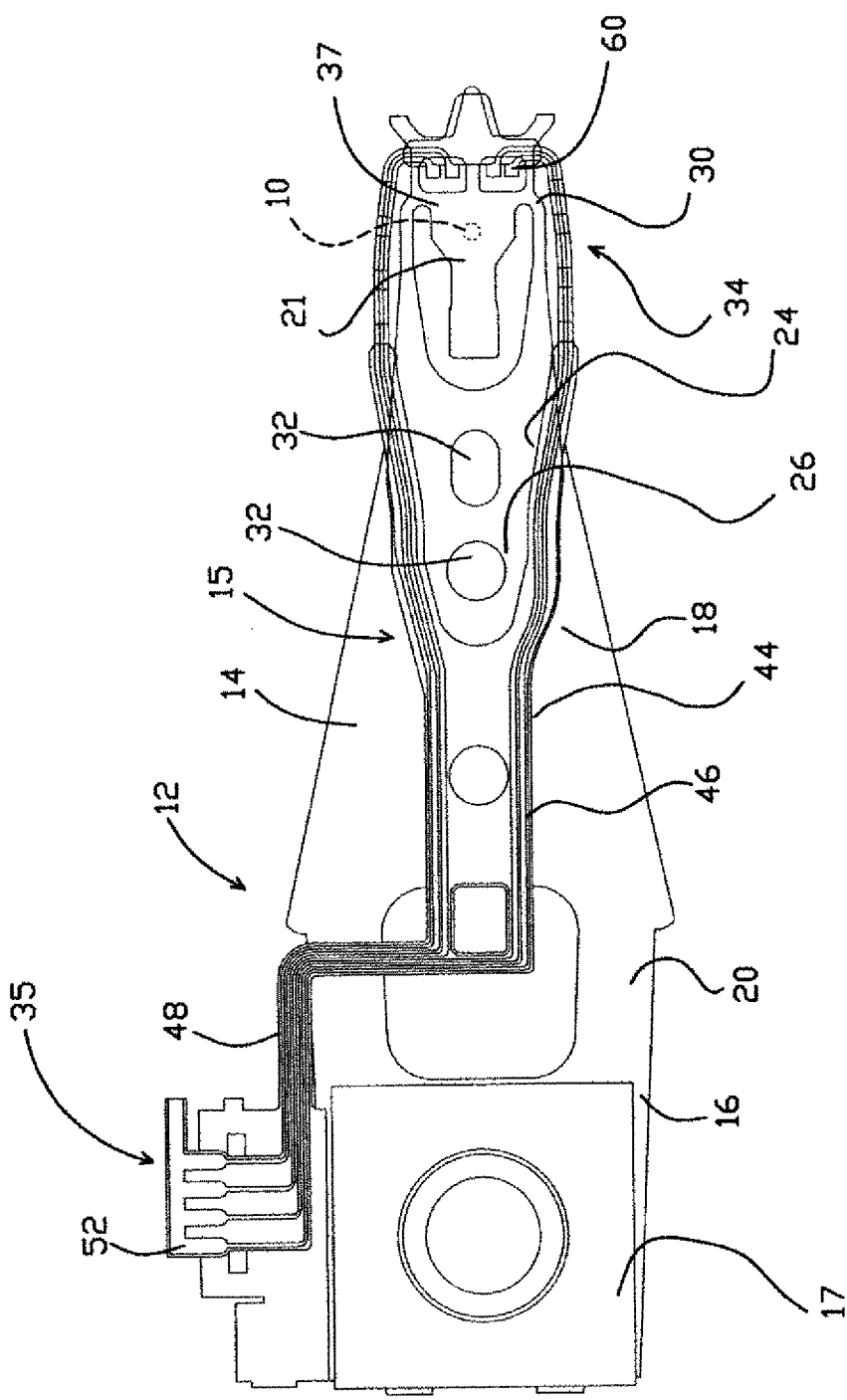
FIG. 1 is a plan view of head suspension assembly having a load point in accordance with the present invention.

FIG. 1 is an illustration of an integrated lead head suspension 12 including a load point 10 in accordance with one embodiment of the present invention. As shown, suspension 12 includes a stainless steel load beam 14 with an integrated lead flexure 15 welded or otherwise attached to the load beam. Load beams such as 14 are well known and commercially available. Load beam 14 includes a mounting region 16 at its proximal end, a relatively rigid region 18 and a spring region 20 between the mounting and rigid regions. A base plate 17 is welded to the mounting region 16. The flexure 15 is configured to have a slider (not shown) adhesively bonded or otherwise mounted on the slider mounting region 21.

Flexure 15 includes a base layer 24 and has a mounting region 26, flexure or gimbal region 34 and tail region 35. The mounting region 26 is configured to be attached to the rigid region 18 of the load beam. Alignment holes 32 in the mounting region 26 are used to accurately position the flexure 15 on the load beam 14 during assembly. The gimbal region 34, located at the distal end of suspension 12, includes spring arms 30, cross member 37 and slider mounting region 21. The base layer 24 is typically formed from stainless steel or other conductive spring material.

Signal leads 46 extend across the flexure 15 between bond pads 60 of slider mounting region 21 and bond pads 52 of tail region 35. Leads 46 are formed of copper alloy or other conductive material in a layer 44 over stainless steel base layer 24. Although not visible in FIG. 1, a layer of dielectric or other insulator material separates the leads 46 from base layer 24. A layer of gold (not shown) is typically plated on leads 46. Conventional deposition (i.e., additive) or etching (i.e., subtractive) manufacturing processes can be used to fabricate flexures 15.

Figure 2:
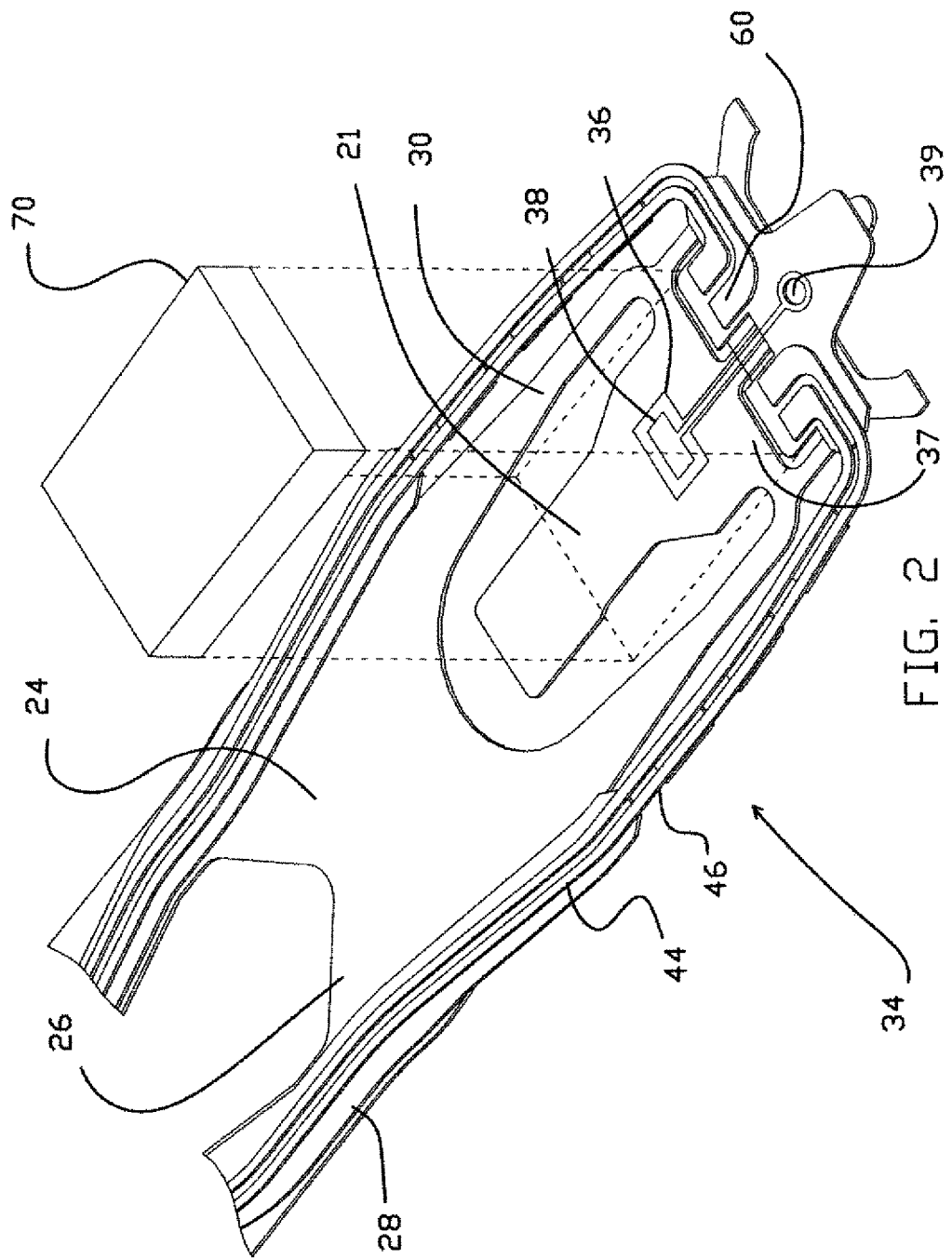
FIG. 2 is a fragmentary isometric view of the slider bonding side of the flexure of the head suspension shown in FIG. 1.

FIG. 2 shows the distal end of flexure 15 in accordance with the present invention. Flexure 15 includes a base layer 24, dielectric layer 28 and conductive layer 44. The gimbal region 34 includes spring arms 30, cross member 37 and slider mounting region 21 for mounting slider 70. Signal leads 46 extend from tail end of flexure (not shown) to bond pads 60. The slider mounting region 21 may include dielectric slider stand-off pads 36 formed from dielectric layer 28. Alternately, slider stand-off pads may include pads 38 formed from conductive layer 44. Pad 38 can be electrically connected to base layer 24 through ground feature 39 as shown or to a terminal pad 52 at tail region 35 via signal lead 46.

Figure 3:
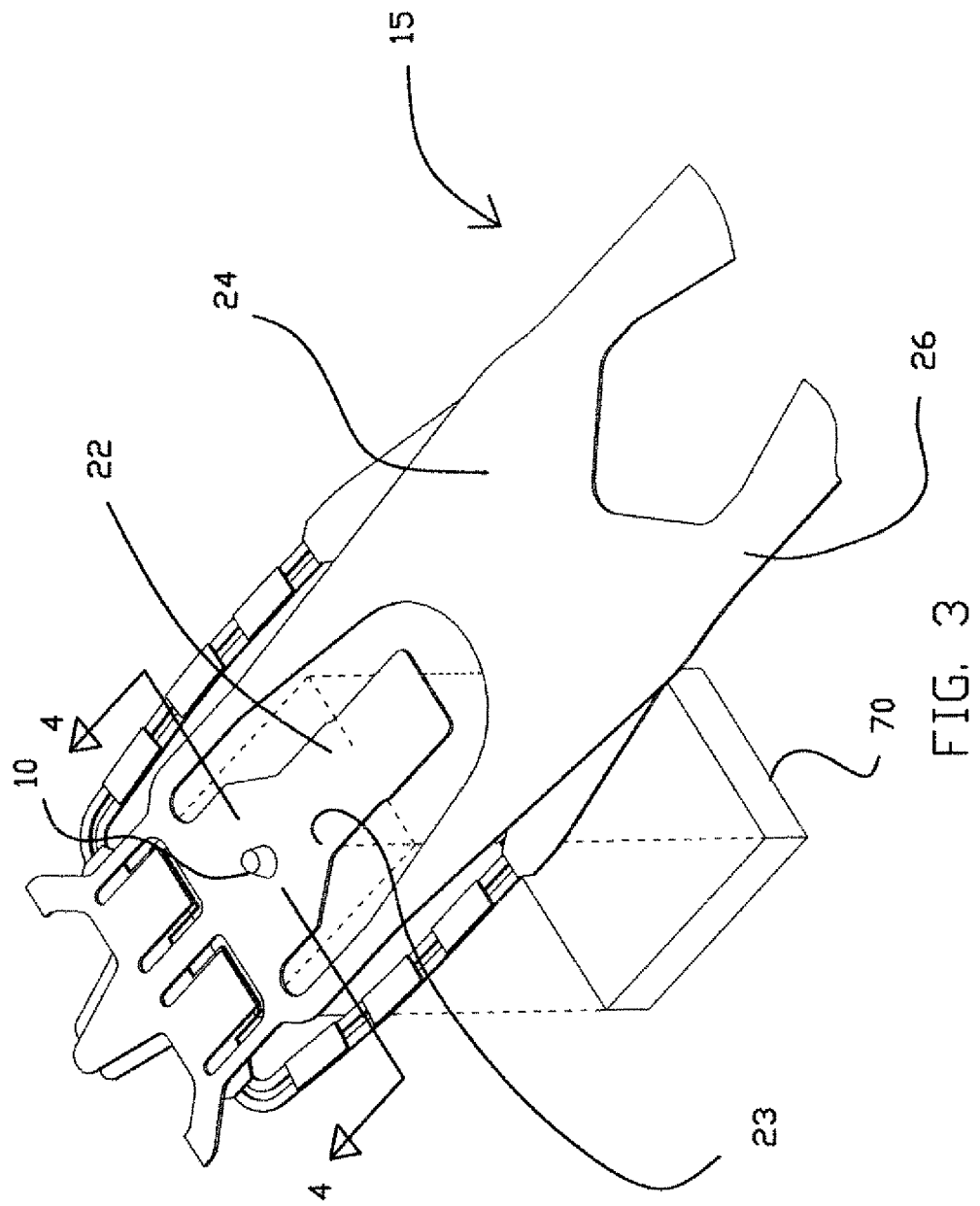
FIG. 3 is a fragmentary isometric view of the opposite side of the flexure shown in FIG. 2, showing the load point.
Figure 4:
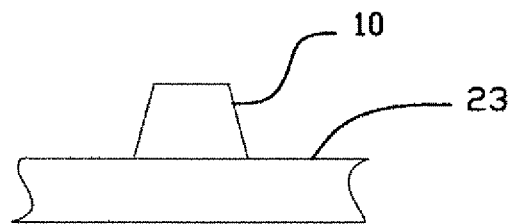
FIG. 4 is a detailed cross-sectional view, taken along line 4-4, of the dimple shown in FIG. 3.

FIG. 3 shows the side of flexure 15 opposite that shown in FIG. 2. Flexure 15 includes load point region 22 having spring metal member 23 and load point dimple 10. Load point dimple 10 is preferably formed of nickel or nickel alloy and plated onto spring metal member 23 using conventional photolithography and electroplating or electroless plating techniques further described with respect to FIGS. 7 and 9. Other alloys having suitable properties, such as those of corrosion and wear, including platinum, chrome or silver could also be used for load point 10. The top surface of load point 10 can also be smoothed, shaped or rounded by controlling plating process parameters. For example, the plating chemistry can be manipulated through the use of additives to suppress high current density regions during the plating process. Other known methods such as laser treatment, coining, etching or the like can also be used to shape or smooth the top surface of the dimple. One example of a laser treated load point and method is described in U.S. Pat. No. 6,617,542 to Hayen et al. in which the load point is smoothed or shaped by applying one or more pulses of laser energy sufficient to melt the surface. U.S. Pat. No. 6,246,546 to Tangren, describes a smoothing and shaping process whereby the load point is engaged by a clamp block and form socket.

Figure 7:
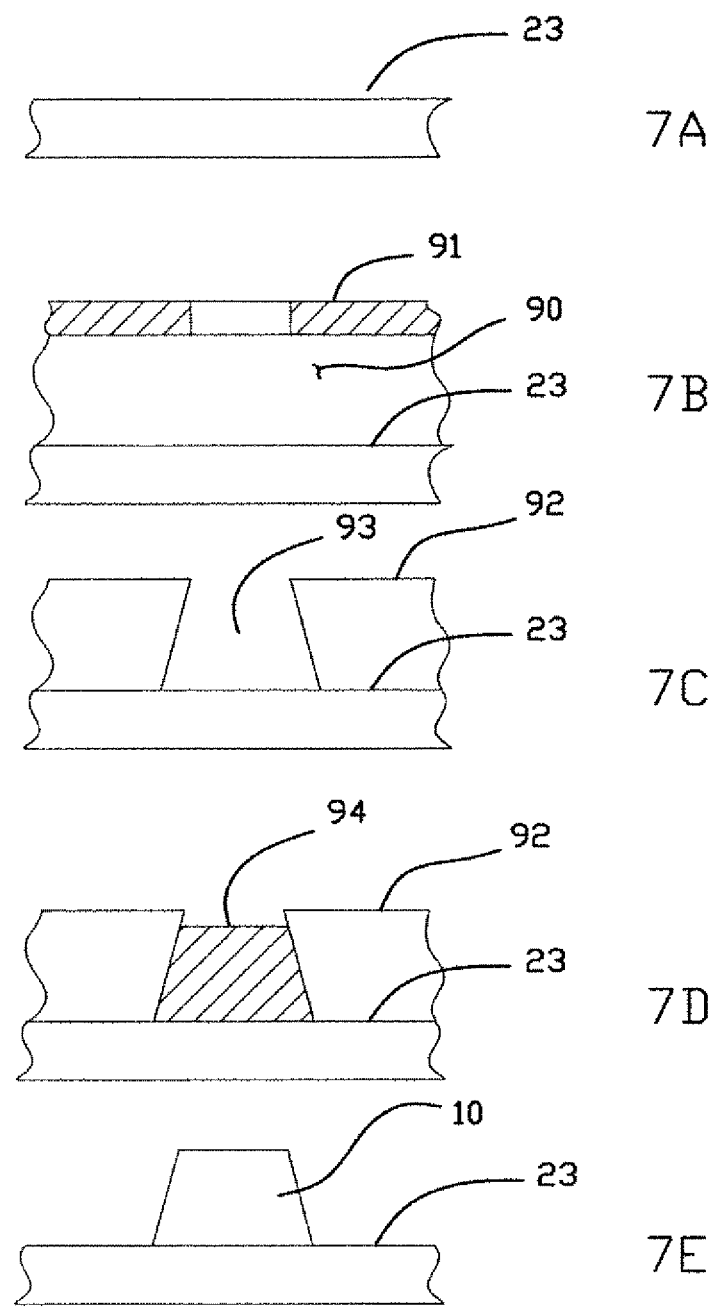
FIGS. 7A-7E are detailed cross-sections of the flexure shown in FIG. 4 illustrating sequential steps of a process for manufacturing the dimple shown in FIG. 1.

Flexures 15 are typically manufactured on a sheet or roll of substrate material using conventional additive or subtractive processes. To maintain precise location of load point 10 with respect to bond pads 60, load point 10 is formed on spring metal member 23 during the manufacturing process of flexure 15. During the etching or deposition of conductive leads 46 and bond pads 60, fiducial locating feature or marks are formed at predetermined locations on the flexure panel or roll. FIG. 7 shows a process flow for manufacturing dimple 10. Spring metal member 23 is coated with photo-imageable resist 90. Photo-tool 91 is located on resist 90 and registered to bond pads 60 using fiducial marks described above. Resist 90 is imaged via photo-tool 91 and developed to create plating mask 92 and plating cavity 93. As shown, the cavity 93 in mask 92 has load point defining side walls and a load point diameter. In the embodiment shown, cavity 93 is located over only a planar portion of spring metal member 23. The planar portion can be unetched as shown in FIGS. 7A-7E, or partially etched or otherwise roughened as described below. In an electroplating process, an electric potential is created in spring metal member 23 and material 94 is deposited on spring metal member 23. Alternately, an electroless plating process is used to deposit material 94 on spring metal member 23. Plating mask 92 is removed to create load point 10.

In one embodiment, material 94 is deposited during the fabrication of a plated ground feature 39 as described in co-pending application Ser. No. 10/782,746, filed Feb. 19, 2004, entitled "Plated Ground Features For Integrated Lead Suspensions" and hereby incorporated by reference. If flexure 15 is fabricated using an additive process, material 94 can be deposited along with other nickel plating operations such as those described in U.S. Pat. No. 7,142,395 to Swanson et al.

Figure 5:
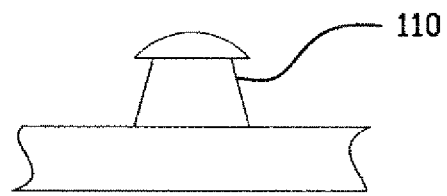
FIG. 5 is a detailed cross-sectional view of a flexure and load point in accordance with another embodiment of the present invention.

By controlling the formation of the plating mask 92 and the plating process, the height, diameter and shape of load point 10 can be customized. In the embodiment shown the walls of the mask 92 in the cavity taper inwardly at a small angle. In other embodiments (not shown) the walls can be perpendicular to the surface of spring metal member 23. Load Point 10 is generally frustroconical in shape but can be any geometric shape such and cylindrical, square, trapezoidal, oval, triangular, etc. The height of load point 10 in one embodiment is approximately 0.001" to 0.006" and the diameter is approximately 0.002" to 0.008" and more preferably approximately 0.004" at the base. The dimple has other size dimensions in other embodiments. In the embodiment shown in FIGS. 7A-7E the material 94 is plated to a height less than the height of cavity 93. In other embodiments the material 94 can be plated to a height substantially the same as that of cavity 93. In yet another embodiment, material 94 is deposited over the top of plating mask 92 to create a mushroomed shaped load point 110, as shown in FIG. 5.

Figure 6:
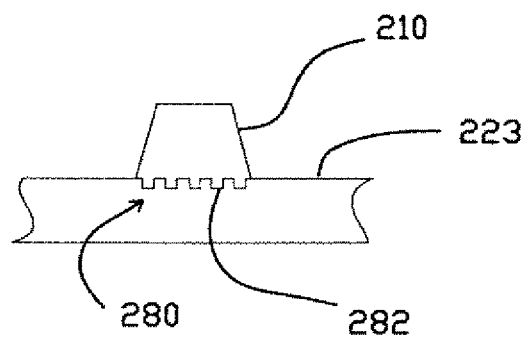
FIG. 6 is a detailed cross-sectional view of a flexure and load point in accordance with yet another embodiment of the present invention.

FIG. 6 shows an alternate embodiment of a load point according to the present invention. Load point 210 includes anchor structure 280 in the form of shallow grooves 282. Grooves 282 are approximately 0.0001"-0.0004" deep and no deeper than approximately 50% of the material thickness of spring metal member 223 although they can have greater or lesser depths in other embodiments. Other anchoring structures such as one or more shallow circular recesses or pockets or otherwise roughened surface are also contemplated. Anchor structure 280 serves to strengthen attachment of load point 210 to spring metal member 223. In one embodiment anchor structure 280 can be formed in load spring metal member 223, prior to plating dimple 210, by known methods such as by partial etching, laser ablation, mechanical forming or punching.

Figure 8:
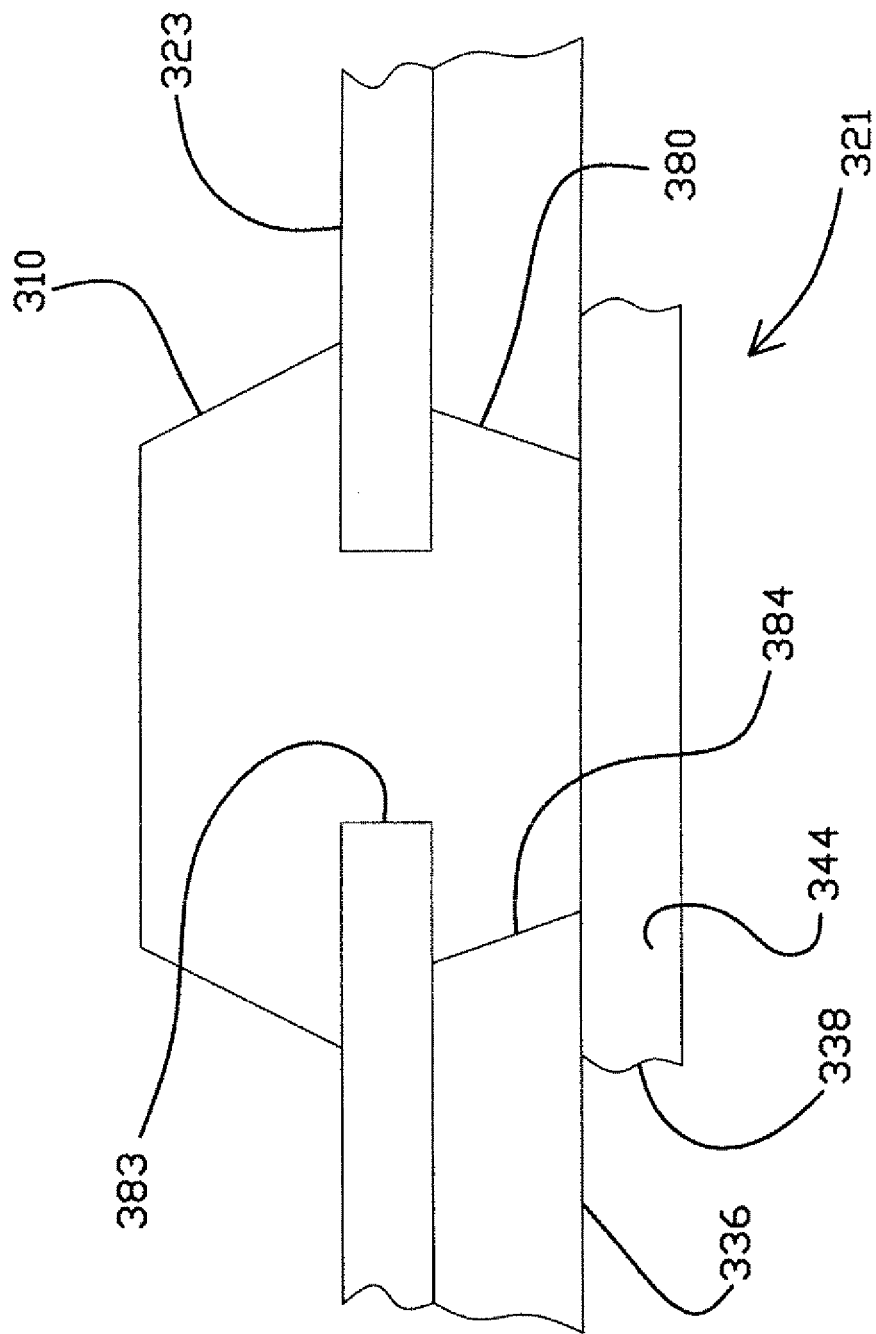
FIG. 8 is a detailed cross-sectional view of a flexure and load point having an alternate anchor structure in accordance with still another embodiment of the present invention.

FIG. 8 shows a cross-sectional view of load point dimple 310 having an alternate anchor structure 380 in anchor holes 383 and 384. Anchor hole 383 is formed in spring metal member 323. In the embodiment shown, slider mounting region 321 includes anchor hole 384 formed in dielectric layer 336 and conductive stand-off pad 338 formed from conductive layer 344.

Figure 9:
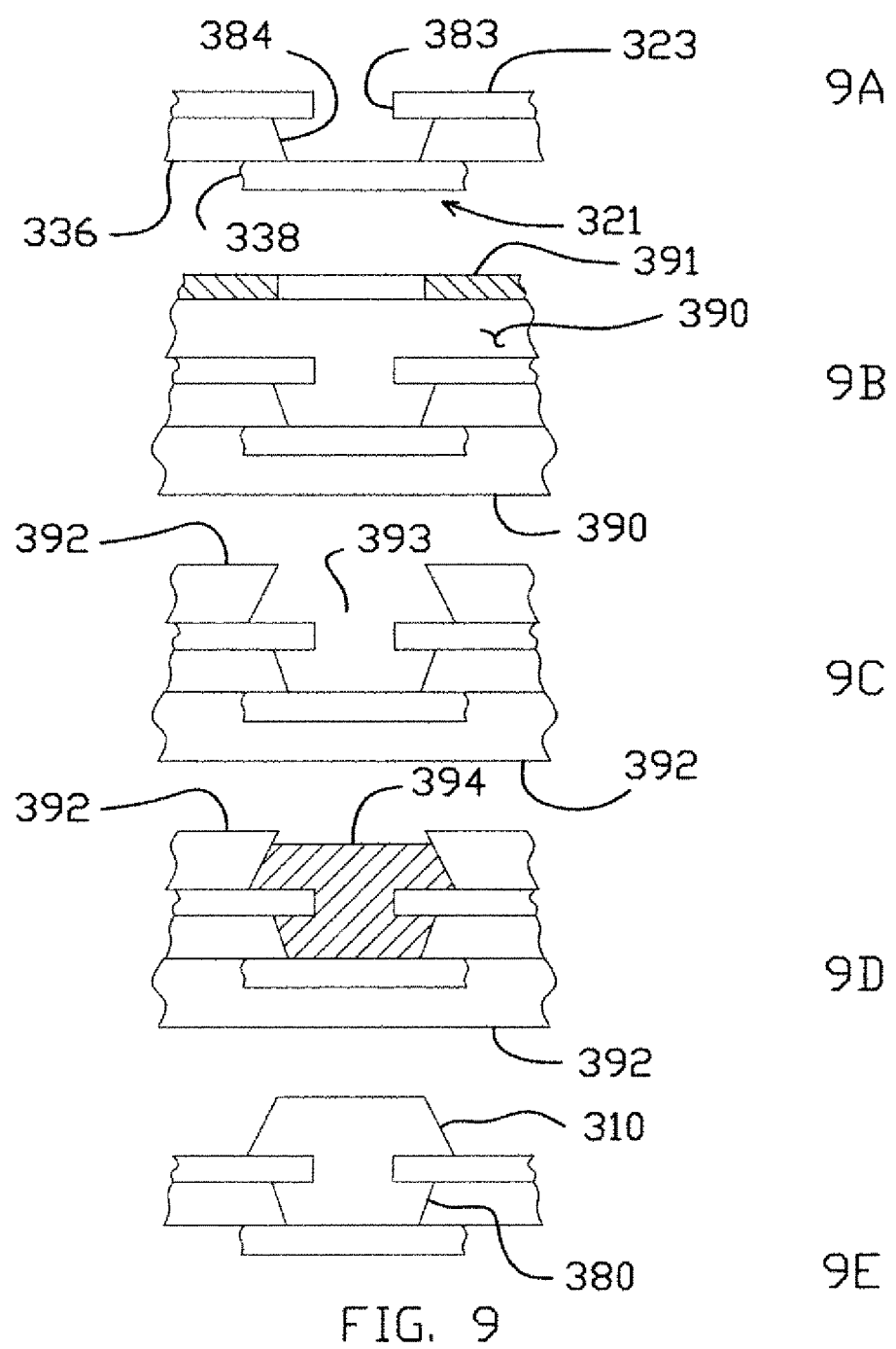
FIGS. 9A-9E are detailed cross-sections of the flexure shown in FIG. 8 illustrating sequential steps of a process for manufacturing the dimple and load point.

FIG. 9 shows a process flow for manufacturing load point 310. Spring metal member 323, having anchor hole 383, and slider mounting region 321, having anchor hole 384 and stand-off pad 338, are coated with a photo-imageable resist 390. Using fiducial marks (not shown) created during the forming of conductive leads 46 and bond pads 60, photo-tool 391 is located on resist 390. Resist 390 is imaged via photo-tool 391 and developed to create plating mask 392 and plating cavity 393. In an electroplating process, an electric potential is created in stand-off pad 338 and material 394 is deposited onto spring metal member 323 and stand-off pad 338. Alternately, an electroless plating process is used to deposit material 394 onto spring metal member 323 and stand-off pad 338. Plating mask 392 is then removed leaving load point 310.

Figure 10:
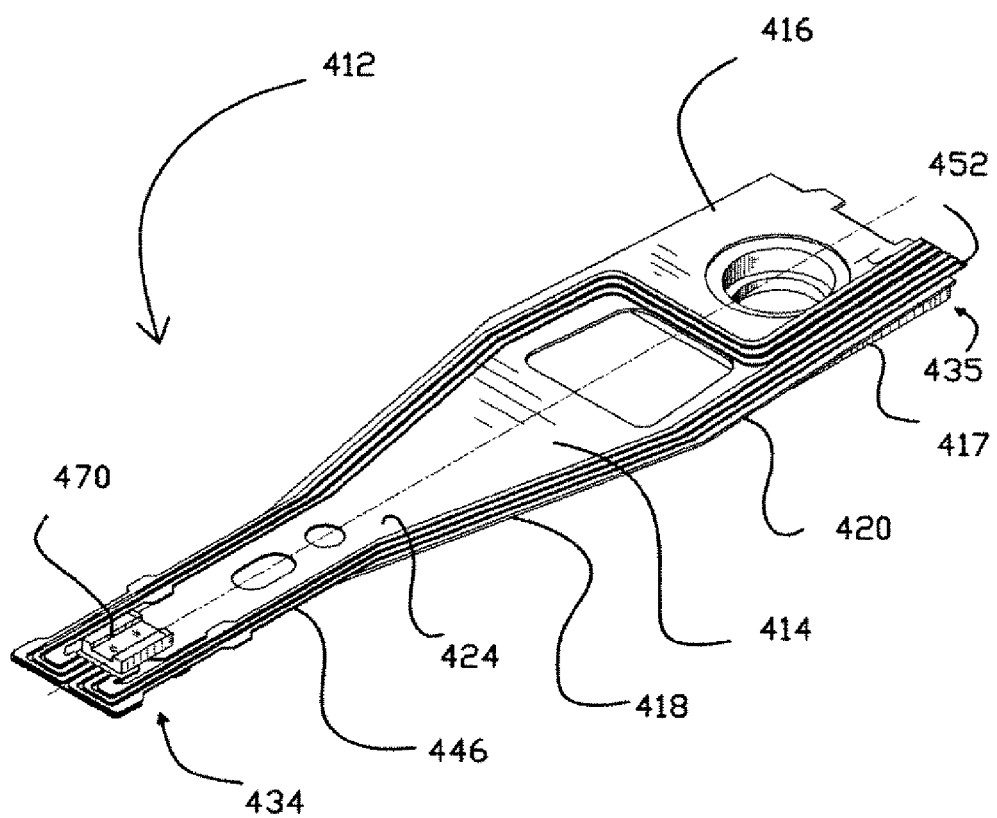
FIG. 10 is an isometric view of head suspension having a flexure integral with the load beam in accordance with an alternate embodiment of the present invention.
Figure 11:
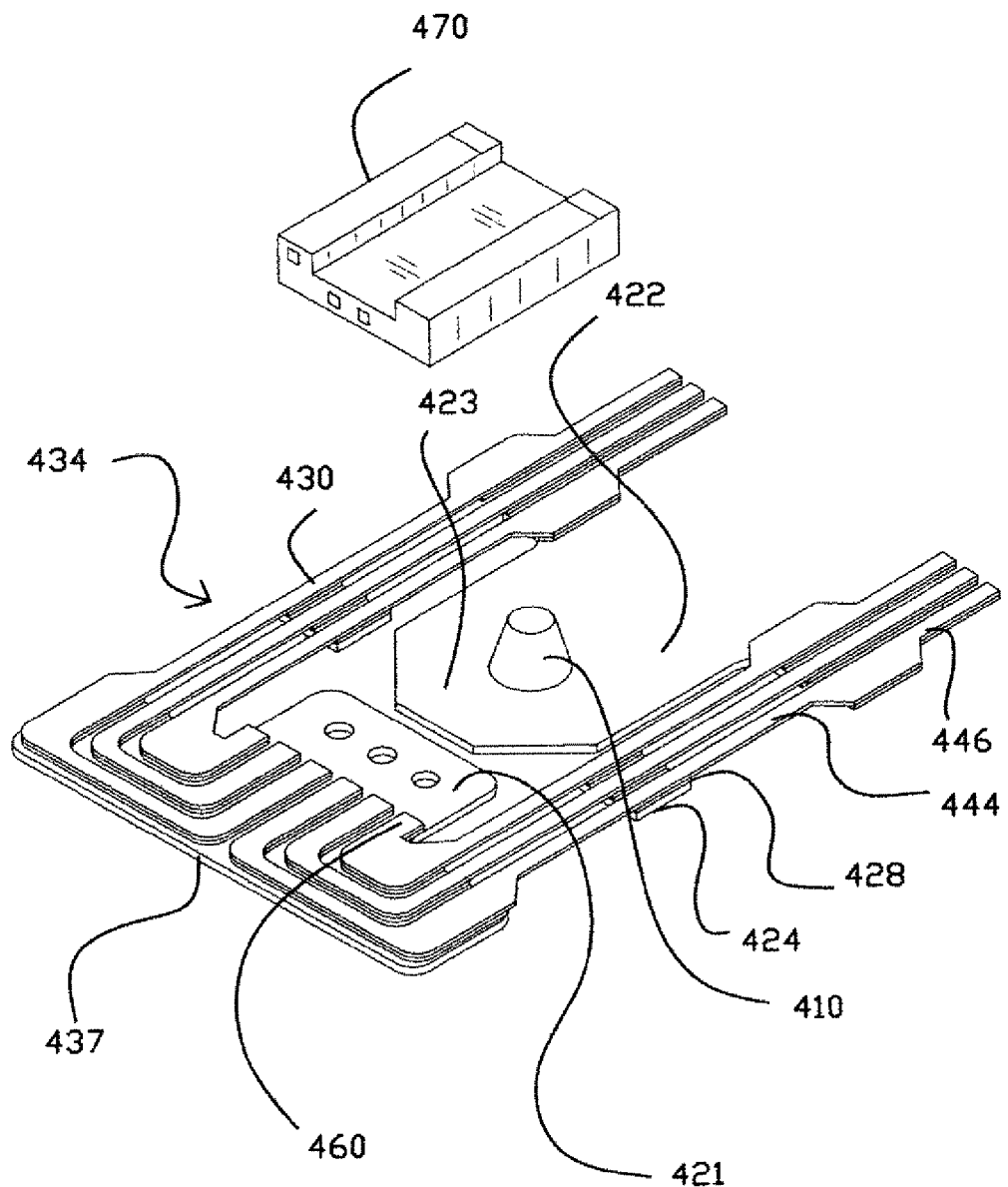
FIG. 11 is a fragmentary isometric view of a distal end of the head suspension shown in FIG. 10 having a load point in accordance with the present invention.

An integrated lead suspension 412 having the flexure or gimbal region 434 integral with the load beam 414 and incorporating dimple embodiments of the present invention is shown in FIG. 10 and FIG. 11. Suspension 412 includes a mounting region 416 at its proximal end, a relatively rigid region 418 and a spring region 420 between the mounting and rigid regions. A base plate 417 is welded to the mounting region 416.

Suspension 412 includes a base layer 424, dielectric layer 428 and conductive layer 444. Signal leads 446 extend across suspension 412 between bond pads 460 on slider mounting surface 421 and bond pads 452 of tail region 435. Leads 446 are formed of copper alloy or other conductive material in the conductive layer 444 over stainless steel base layer 424. Dielectric layer 428 separates the leads 446 from base layer 424. A layer of gold (not shown) is typically plated on leads 446. Conventional deposition (i.e., additive) or etching (i.e., subtractive) manufacturing processes can be used to fabricate suspension 412.

As shown in FIG. 11, gimbal 434 includes spring arms 430, cross member 437 and slider mounting surface 421 for mounting slider 470. Load point 410 is plated, using methods similar to those of previous embodiments, on spring metal member 423 of load point region 422. In the embodiment shown, spring arms 430 are formed from leads 446. Embodiments having spring arms formed from base layer 424 are also contemplated.

Although the present invention has been described with reference to preferred embodiments, those skilled in the art will recognize that changes can be made in form and detail without departing from the spirit and scope of the invention.

What is claimed is:

1. A method for manufacturing a disk drive head suspension flexure having a load point on a spring metal member, comprising:
    etching an aperture into the spring metal member;
    forming a photoresist mask having an opening with load point-defining side walls and a load point diameter over a portion of the spring metal member and
    plating metal onto the spring metal member and into the aperture in the opening of the photoresist mask to form the load point having the load point diameter on the spring metal member; and
    removing the photoresist mask from the spring metal member after forming the load point.

2. The method of claim 1 wherein plating metal to form the load point includes plating the metal to a height substantially equal to a desired height of the load point.

3. The method of claim 2 wherein forming the photoresist mask includes forming the photoresist mask having side walls with a height substantially equal to or greater than a desired height of the plated metal load point.

4. The method of claim 1 wherein forming the photoresist mask includes forming the photoresist mask having side walls with a height substantially equal to or greater than a desired height of the plated metal load point.

5. The method of claim 1 wherein forming the photoresist mask includes forming the photoresist mask having side walls with a height substantially equal to or less than a desired height of the plated metal load point.

6. The method of claim 1 wherein plating metal to form the load point includes plating the metal to a height greater than the height of the photoresist mask side walls.

7. The method of claim 1 wherein the forming the photoresist mask includes forming the photoresist mask having side walls that are substantially perpendicular to the spring metal member.

8. The method of claim 1 wherein forming the photoresist mask includes forming a mask having side walls that are inwardly sloping with respect to the spring metal member.

9. The method of claim 1 and further including smoothing an upper surface of the plated load point.

10. The method of claim 9 wherein smoothing the load point includes laser polishing or coining the upper surface of the load point.

11. The method of claim 1 for forming the plated load point on the flexure including a spring metal layer, a conductive trace layer and an insulating layer between the spring metal layer and the conductive trace layer, wherein:
    the method further includes etching the insulating layer between the aperture in the spring metal layer and the conductive trace layer; and
    plating the metal to form the load point includes plating the metal in the etched insulating layer.

12. The method of claim 11 wherein:
    etching the insulating layer includes etching a hole in the insulating layer; and
    plating the metal to form the load point includes plating the metal on the conductive trace layer in the hole in the insulating layer.

13. The method of claim 12 wherein plating the metal to form the load point includes plating the metal to a height substantially equal to a desired height of the load point.

14. The method of claim 13 wherein forming the photoresist mask includes forming the photoresist mask having side walls with a height substantially equal to or greater than a desired height of the plated metal load point.

15. The method of claim 12 wherein forming the photoresist mask includes forming the photoresist mask having side walls with a height substantially equal to or greater than a desired height of the plated metal load point.

16. The method of claim 12 wherein forming the photoresist mask includes forming the photoresist mask having side walls with a height substantially equal to or less than a desired height of the plated metal load point.

17. The method of claim 12 wherein plating the metal to form the load point includes plating the metal to a height greater than the height of the photoresist mask side walls.

18. The method of claim 12 wherein the forming the photoresist mask includes forming the photoresist mask having side walls that are substantially perpendicular to the spring metal member.

19. The method of claim 12 wherein forming the photoresist mask includes forming a mask having side walls that are inwardly sloping with respect to the spring metal member.

20. The method of claim 12 and further including smoothing an upper surface of the plated load point.

* * * * *

UNITED STATES PATENT AND TRADEMARK OFFICE
CERTIFICATE OF CORRECTION

PATENT NO. : 8,881,375 B2
APPLICATION NO. : 13/311805
DATED : November 11, 2014
INVENTOR(S) : Zachary A. Pokornowski et al.

Page 1 of 1

It is certified that error appears in the above-identified patent and that said Letters Patent is hereby corrected as shown below:

IN THE CLAIMS:

Column 5, line 41, [claim 1] in the phrase "the spring metal member and", after "member" insert --including the aperture;-- and delete "and"

Signed and Sealed this
Seventeenth Day of February, 2015

Michelle K. Lee
*Deputy Director of the United States Patent and Trademark Office*